US011465519B2

(12) United States Patent
Zoon et al.

(10) Patent No.: US 11,465,519 B2
(45) Date of Patent: Oct. 11, 2022

(54) ELECTRIC VEHICLE CHARGE EQUIPMENT

(71) Applicant: ABB Schweiz AG, Baden (CH)

(72) Inventors: Wiebe Zoon, Delft (NL); Gertjan Koolen, Eindhoven (NL); Rolf Bilderbeek, Utrecht (NL)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/131,799

(22) Filed: Dec. 23, 2020

(65) Prior Publication Data

US 2021/0114475 A1 Apr. 22, 2021

Related U.S. Application Data

(63) Continuation of application No. PCT/EP2019/067100, filed on Jun. 26, 2019.

(30) Foreign Application Priority Data

Jun. 27, 2018 (EP) .................................... 18180034

(51) Int. Cl.
*B60L 53/302* (2019.01)
*B60L 53/16* (2019.01)
(Continued)

(52) U.S. Cl.
CPC ............. *B60L 53/302* (2019.02); *B60L 53/16* (2019.02); *B60L 53/18* (2019.02); *H02J 7/0045* (2013.01); *H02J 7/007192* (2020.01)

(58) Field of Classification Search
CPC ............. H02J 7/0045; H02J 7/007192; H01R 13/005; H01R 2201/26; B60L 53/18;
(Continued)

(56) References Cited

U.S. PATENT DOCUMENTS 9,827,871 B2 * 11/2017 Del Core ................ B60L 58/27
10,236,543 B2 3/2019 Duncan et al.
(Continued)

FOREIGN PATENT DOCUMENTS

CN 103828177 A 5/2014
CN 107933340 A 4/2018
(Continued)

*Primary Examiner* — Suresh Memula
(74) *Attorney, Agent, or Firm* — Leydig, Voit & Mayer, Ltd.

(57) ABSTRACT

An electric vehicle charge equipment (EVSE) for supplying a charge current to an electrical vehicle includes: a liquid cooled charge cable with a charge connector for connecting to the electrical vehicle; and a charge current regulating device for regulating the charge current based on a temperature of the cooling liquid. Regulating the charge current includes: charging the electrical vehicle with a first charge current for an initial time period and thereafter charging the electrical vehicle with a second charge current that is greater than the first charge current, and/or reducing the charge current as long as the temperature of the cooling liquid is below a temperature threshold, and/or charging the electrical vehicle with a first charge current as long as the temperature of the cooling liquid is below a temperature threshold and thereafter charging the electrical vehicle with a second charge current that is greater than the first charge current.

16 Claims, 1 Drawing Sheet

2
4
3
5
8
1
6
9
7

(51) Int. Cl.
*B60L 53/18* (2019.01)
*H02J 7/00* (2006.01)

(58) Field of Classification Search
CPC .......... B60L 53/14; B60L 53/16; B60L 53/00; B60L 53/302; B60L 2240/36; B60L 2240/80; Y02T 90/12; Y02T 10/70; Y02T 90/14; Y02T 10/7072
USPC .......................................................... 320/109
See application file for complete search history.

(56) References Cited

U.S. PATENT DOCUMENTS 11,034,253 B2* 6/2021 Vaughan ................. F28D 15/00
2012/0043943 A1* 2/2012 Dyer ..................... B60L 53/302 320/160
2014/0039754 A1* 2/2014 Nishizawa .............. B60L 50/51 701/34.4
2015/0054460 A1* 2/2015 Epstein ................... B60L 53/53 320/109
2016/0155278 A1* 6/2016 Nozawa ............ B60W 30/1843 701/22
2018/0029483 A1* 2/2018 Del Core ................ B60L 8/006
2018/0304757 A1* 10/2018 Vaughan ................. B60L 53/30
2018/0361866 A1* 12/2018 Ferran ................. H01M 10/613
2019/0047429 A1* 2/2019 Torkelson ........... H01M 10/633
2019/0118661 A1* 4/2019 Kim ...................... H02J 7/0029
2019/0217728 A1* 7/2019 Reber ..................... B60L 53/18
2021/0046836 A1* 2/2021 Laemmle ................ H02J 50/12

FOREIGN PATENT DOCUMENTS

CN 209257902 U * 8/2019
CN 210234715 U * 4/2020
CN 112272902 A * 1/2021 .......... B60L 11/1816
DE 202011050446 U1 9/2011
DE 102013021765 A1 6/2015
DE 102013021765 A1 * 6/2015 .............. B60L 11/18
DE 102017215808 A1 * 3/2019
DE 102020204695 A1 * 8/2021
DE 102020120385 A1 * 2/2022
DE 102020210670 A1 * 2/2022
EP 3572270 A1 * 11/2019 .............. B60L 53/11
EP 3588686 A1 * 1/2020 .............. B60L 53/00
WO WO-2016054068 A1 * 4/2016 ................ B60L 1/08
WO WO-2019081245 A1 * 5/2019 .............. B60L 53/16
WO WO-2019138731 A1 * 7/2019 ............... B60H 1/08
WO WO-2019162680 A1 * 8/2019 .............. B60L 50/60
WO WO-2020013455 A1 * 1/2020 .............. B60L 50/64
WO WO-2021048490 A1 * 3/2021
WO WO-2021123469 A1 * 6/2021 ............... B60H 1/32
WO WO-2022006352 A1 * 1/2022

* cited by examiner

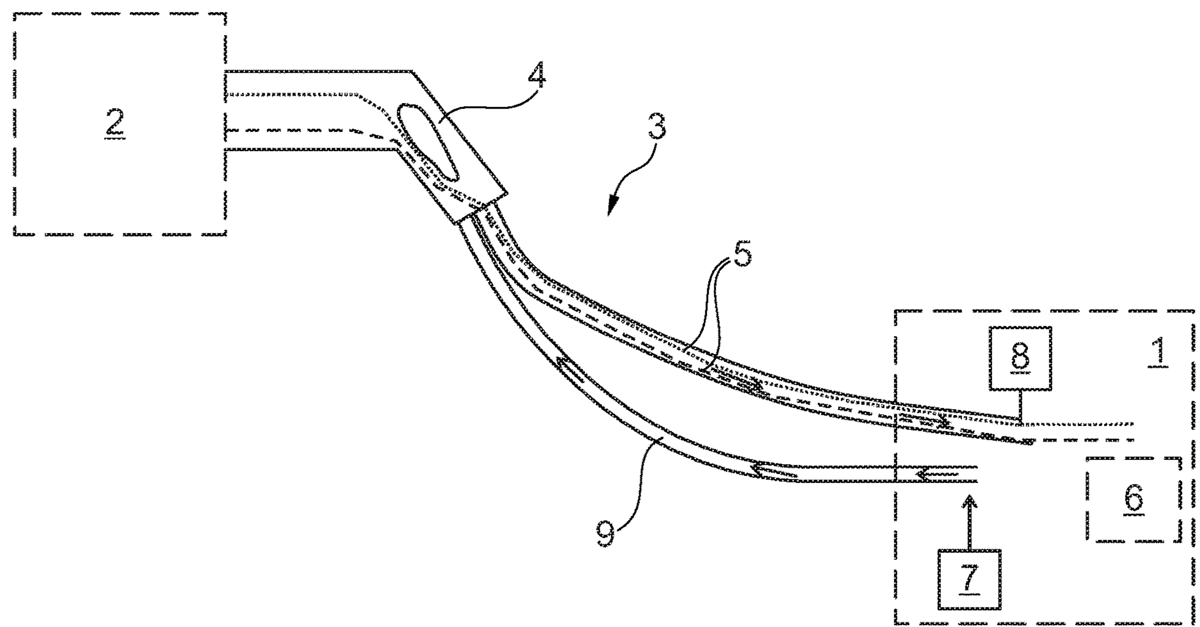
2
4
3
5
8
1
6
9
7

ELECTRIC VEHICLE CHARGE EQUIPMENT

CROSS-REFERENCE TO PRIOR APPLICATION

This application is a continuation of International Patent Application No. PCT/EP2019/067100, filed on Jun. 26, 2019, which claims priority to European Patent Application No. EP 18 180 034.3, filed on Jun. 27, 2018. The entire disclosure of both applications is hereby incorporated by reference herein.

FIELD

The invention relates to an electric vehicle charge equipment (EVSE) configured for supplying a charge current to an electrical vehicle, whereby the EVSE comprises a liquid cooled charge cable with a charge connector for connecting to the electrical vehicle. The invention further relates to a method for regulating a charge current at an electric vehicle charge equipment (EVSE) configured for supplying the charge current to an electrical vehicle, wherein the EVSE comprises a liquid cooled charge cable with a charge connector for connecting to the electrical vehicle.

BACKGROUND

Electric vehicle, EV, direct current, DC, fast charging methods and systems often use a so called Combined Charging System, CCS, protocol according to IEC 61851-23 and SAE J1772 standard for charging electrical vehicles both in the US and in the European Union, EU. As charge currents increase, liquid cooled charge cables for connecting an Electric Vehicle Supply Equipment, EVSE, via a charge connector with the electrical vehicle are becoming more commonly used. The liquid cooling allows copper conductors within the charging cable to become thinner, and thereby less stiff and easier to use, because excessive heat due to high charging currents and charging cable internal resistances is taken care of.

DE 10 2013 021 765 A1 describes a motor vehicle, in particular an electric motor vehicle, comprising an electrical energy store and a charge connection element which can be connected or connected to the electrical energy store for electrically connecting the electrical energy store to an external energy supply device providing electrical energy.

DE 20 2011 050 446 U1 describes an electrical connector device comprising a housing having at least one electrical contact element disposed therein, a cavity having an access opening and an outlet opening through which the cavity can be flowed through with a cooling medium.

For liquid cooled charge cables where the cooling liquid comes into contact with the copper conductors require a coolant that is not electrically conductive, such as an oil-based coolant. The disadvantage of oil-based coolant is that oil gets more viscous at low temperatures. If the oil is too viscous, flow of the cooling liquid through the charge cable becomes so low that the charge cable may overheat near an end of the charge cable such that the charge cable may become damaged.

SUMMARY

In an embodiment, the present invention provides an electric vehicle charge equipment (EVSE) configured for supplying a charge current to an electrical vehicle, the EVSE comprising: a liquid cooled charge cable with a charge connector configured to connect to the electrical vehicle; and a charge current regulating device configured for regulating the charge current based on a temperature of the cooling liquid, wherein regulating the charge current comprises: charging the electrical vehicle with a first charge current for an initial time period and thereafter charging the electrical vehicle with a second charge current that is greater than the first charge current, and/or reducing the charge current as long as the temperature of the cooling liquid is below a temperature threshold, and/or charging the electrical vehicle with a first charge current as long as the temperature of the cooling liquid is below a temperature threshold and thereafter charging the electrical vehicle with a second charge current that is greater than the first charge current.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows an example implementation of an electric vehicle charging equipment (EVSE) according to a preferred embodiment of the invention in a schematic view.

DETAILED DESCRIPTION

In an embodiment, the present invention provides an electric vehicle charge equipment, EVSE, and a respective method for charging an electrical vehicle by using a liquid cooled charge cable, whereby overheating and respective damaging of the charge cable is avoided.

In an embodiment, the present invention provide an electric vehicle charge equipment (EVSE) configured for supplying a charge current to an electrical vehicle, whereby the EVSE comprises a liquid cooled charge cable with a charge connector for connecting to the electrical vehicle, and a charge current regulating device configured for regulating the charge current based on a temperature of the cooling liquid.

In an embodiment, the present invention provide a method for regulating a charge current at an electric vehicle charge equipment (EVSE) configured for supplying the charge current to an electrical vehicle, wherein the EVSE comprises a liquid cooled charge cable with a charge connector for connecting to the electrical vehicle, and the method comprises the step:

regulating the charge current based on a temperature of the cooling liquid.

It is therefore a key point of the invention that the charge current is regulated e.g. controlled based on the temperature of the cooling liquid. Thus, for example, the charge current regulating device respectively the method regulates the charge current as to start with a lower charge current as long as the temperature of the cooling liquid is lower than a temperature threshold value. Once the cooling liquid is warmed up, due to heat resulting from high charging currents and charge cable internal resistances, the charge current can be changed to a higher setting for example to the maximum charging current. Such way the proposed EVSE and the method take care that cooling liquid, in particular oil-based cooling liquid as not electrically conductive cooling liquid, is more viscous at low temperatures and may thus not provide a sufficiently high flow rate through the charge cable. By regulating the charge current based on the temperature of the cooling liquid the viscosity respectively flow rate of the cooling liquid can be taken care of such that overheating and respective damaging of the charge cable is avoided.

In other words, at low ambient temperatures the viscosity of the cooling liquid in a cooling liquid reservoir is the most important factor in what flow speed can be reached in the cooled charge cable. The flow of the coolant determines directly the cooling capability of the EVSE. If the cooling liquid is too cold and therefore too viscous to provide enough flow to cool the charge cable, the part of the charge cable that is cooled last may overheat. If the temperature is so low that there is hardly any flow, the charge cable will overheat and damage the charge cable, even before an increased temperature of the cooling liquid can be detected. Preferably, the charge current is reduced or switched off i.e. charging is stopped if overheating is detected for avoiding any damage at the charge cable, the charge connector and/or at the EVSE.

With the proposed EVSE respectively with the method, according to exemplary implementation, the charging current may be regulated respectively reduced to 350 A based on a low temperature of the cooling liquid of for example 30° C. instead of 500 A as maximum charge current. Reducing the charge current such way approximately halves the losses in the charge cable, and therefore provides enough time for the cooling liquid in the cooling liquid reservoir to heat up, without risk of damaging the charge cable. Once the temperature of the cooling liquid in particular at a supply point to the charge cable reaches the temperature threshold, the charge current is increased to its nominal value of 500 A. The value of the temperature threshold may depend on which type of coolant is used.

Generally, the EVSE, electric vehicle supply equipment, also referred to as electric vehicle charging station, EV charging station, electric recharging point, charging point and charge point, is an element in an infrastructure that supplies electric energy for the recharging of electric vehicles, such as plug-in electric vehicles, including electric cars, neighborhood electric vehicles and plug-in hybrids. The charge cable preferably comprises DC conductors having a diameter of ≥25 $mm^2$, 50 $mm^2$ or 70 $mm^2$ and/or a length of ≥4 m, 5 m or 7.5 m and ≤5 m, 7.5 m or 10 m.

For cooling the charge cable, a cooling device can be provided, which is preferably arranged at the EVSE and/or which is configured that the cooling liquid is conveyed from a first end to a second, opposite end of the charge cable, and thereafter from the second end to the first end. The charge current regulating device may be provided as a current limiting device allowing in particular temporarily limiting the charge current in relation to a maximum charge current. The term regulating the charge current based on the temperature of the cooling liquid is preferably understood that the charge current is controlled, limited and/or reduced depending on the temperature of the cooling liquid. Thus, regulating the charge current may comprise switching off the charge current is an overheating is detected, for example if the temperature of the cooling liquid exceeds a threshold. The cooling liquid is preferably provided as an oil-based coolant thereby allowing that the cooling liquid comes into contact with unshielded copper conductors of the charge cable.

In a further preferred implementation of the EVSE or of the method regulating the charge current comprises measuring the temperature of the cooling liquid. The temperature of the cooling liquid is preferably measured at an input and/or at an output of the charge cable, where the cooling liquid is injected into the charge cable. Regulating the charge current is preferably based on the measured temperature of the cooling liquid at the output, in particular where the cooling liquid exits from charge cable at the EVSE for example into the cooling liquid reservoir. More preferably, the charge current is regulated based on the temperature of the cooling liquid going to the charge cable. The lowest temperature of the cooling liquid, be it at the charge connector or at the EVSE, defines the viscosity bottleneck. Thus, the charge current is preferably regulated based on the lowest temperature of the cooling liquid within the overall cooling system comprising the liquid cooled charge cable, the cooling liquid reservoir etc.

In a further preferred implementation of the EVSE or of the method regulating the charge current comprises charging the electrical vehicle with a first charge current for an initial time period and thereafter charging the electrical vehicle with a second charge current, which is greater than the first charge current. The length of the initial time period is preferably dependent on the temperature of the cooling liquid and/or may be pre-defined depending on a type of the cooling liquid, for example dependent on a heating characteristic of the cooling liquid.

In a further preferred implementation of the EVSE or of the method regulating the charge current is based on an ambient temperature. At a lower ambient temperature it may take longer until the cooling liquid is sufficiently viscous respectively until friction is sufficiently less such that conductors of the charging cable be can sufficiently cooled for avoiding overheating and damages. Thereby, the charge current may be lowered longer and/or by a higher percentage value the lower the ambient temperature is.

In a further preferred implementation of the EVSE or of the method regulating the charge current comprises reducing the charge current as long as the temperature of the cooling liquid is below a temperature threshold. Said temperature threshold may dependent on a characteristic of the cooling liquid and/or on ambient temperature. For example, in northern European countries the temperature threshold might be −10° C., while in Arabic countries the temperature threshold might be 30° C. The temperature threshold can be predefined and/or freely programmable and/or configurable at the EVSE.

In a further preferred implementation of the EVSE or of the method regulating the charge current comprises charging the electrical vehicle with a first charge current as long as the temperature of the cooling liquid is below a temperature threshold and thereafter charging the electrical vehicle with a second charge current, which is greater than the first charge current. The first charge current can be, for example, 40, 50, 60 or 75% of a nominal charge current or of the maximum charge current. In this regard, regulating the charge current may comprise a constant regulation at each time depending on the actual temperature of the charge current. Thus, the charge current may increase linearly or in a nearly linear manner.

In a further preferred implementation of the EVSE or of the method regulating the charge current comprises measuring the temperatures of the cooling liquid at an input and an output for the cooling liquid at the charge cable and as long as a difference of the measured temperatures exceeds a threshold reducing the charge current. Such way a self-regulating system is provided, whereby the charge current can be increased once the difference is below the threshold. Measuring the temperature at the input is preferably to be understood that the temperature is measured at a supply point at which the cooling liquid is applied towards the charging cable and/or where the cooling liquid exits the cooling liquid reservoir preferably arranged within the EVSE. In turn, measuring the temperature at the output is preferably to be understood that cooling liquid has already cooled the conductors of the charging cable and/or is measured a point where the cooling liquid exits the charge cable and/or reaches again the cooling liquid reservoir.

In a further preferred implementation the EVSE or the method comprises a fluid supply line, which runs from the EVSE to the charge connector and is connected at the charge connector to the charge cable for injecting the cooling liquid into the charge cable. The fluid supply line runs preferably parallel to the charge cable and/or is separate to the charge cable i.e. separately connected to the connector and the EVSE. Preferably the fluid supply line acts as conveyer line for the cooling liquid. Such way, as the cooling liquid is injected into the charge cable preferably within the charge connector, the charge connector that is touched by a user is the coolest part of the charge cable.

In a further preferred implementation the EVSE or the method comprises an input temperature measuring device configured for measuring the temperature of the cooling liquid applied towards the charge cable and an output temperature measuring device configured for measuring the temperature of the cooling liquid having cooled the charge cable. Preferably the input temperature measuring device is configured for measuring the temperature of the cooling liquid at the fluid supply line, for example within the EVSE or within the charge connector, and/or the output temperature measuring device is configured for measuring the temperature of the cooling liquid at the charge cable, for example within the EVSE and/or at a supply point where the charge cable is connected with the EVSE. In this regard it is according to a further implementation of the EVSE or of the method preferred that the input temperature measuring device and the output temperature measuring device are arranged within the EVSE.

In a further preferred implementation of the EVSE or of the method the temperature threshold depends on the cooling liquid. In another preferred implementation of the EVSE or of the method regulating the charge current based on a temperature of the cooling liquid. By measuring the temperature of the cooling liquid, for example within the cooling liquid reservoir as described before, the cooling capacity of the cooling liquid, which depends on an ambient temperature, on a type of the cooling liquid respectively its characteristic and on its actual temperature, the charge current can be controlled by the proposed EVSE and the respective method for ensuring that at all times sufficient cooling is provided for mitigating any overheating or destruction of the charge cable.

In a further preferred implementation of the EVSE or of the method the EVSE is configured for charge the electrical vehicles by using a Combined Charge System, CCS, protocol according to IEC 61851-23 and/or SAE J1772 standard and/or whereby the charge connector and/or the charge cable are provided according to IEC 62196 standard. The DC charging cable may comprise further conductors, such as, for example, a Proximity Pilot, PP, line for a PP signal, a Control Pilot, CP, line for a CP signal line and/or a PE line for a PE signal. PP line, CP line and/or PE line and respectively signalling are preferably implemented according to the so called Combined Charging System, CCS, protocol, in particular according to IEC 61851 or IEC 61851-23 standard. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium. Besides other protocols such as, for example, CHAdeMO, as abbreviation of CHArge de Move, or GB/T, in particular according to 20234.3-2011 standard, can also be used with the described EVSE respectively the method. The EVSE and the method are applicable to different type of electrical vehicles, including for examples electrical busses. Preferably, the EVSE and/or the method is configured for charging the electrical vehicles with a DC input voltage up to 1500 V DC.

FIG. 1 shows an electric vehicle charging equipment (EVSE) 1 for charging an electrical vehicle 2 with a charge current. The EVSE 1 comprises a liquid cooled charge cable 3 with a respective charging connector 4 connected thereto. The liquid cooled charge cable 3 is cooled by a non-electrically conductive oil-based coolant, which is in contact with copper conductors 5 of the charge cable 3. The charging cable 3 and the charge connectors 4 are provided according to IEC 62196 standard, while the EVSE 1 is configured for charging the electrical vehicle 2 by using a Combined Charging System, CCS, protocol according to IEC 61851-23 and SAE J1772 standard.

The EVSE 1 further comprises a charge current regulating device 6, which is provided as a current limiting device that is configured to regulate the charge current based on a temperature of the cooling liquid. Specifically, the charge current regulating device 6 regulates the charge current based on a measured temperature of the cooling liquid such that the electrical vehicle 2 is initially charged with a first charge current for an initial time period and thereafter, once the measured temperature has exceeded a predefined temperature threshold, the electrical vehicle 2 is charged with a second charge current, which is greater than the first charge current. For example, the electrical vehicle 2 is initially charged with 350 A and once the cooling liquid has exceeded 30° C. is charged with 500 A. Thereby, the temperature threshold can be dependent on ambient temperature. Thus, the temperature threshold can be, for example, −10° C. or 30° C. as before.

Reason is that at low ambient temperatures the viscosity of the oil-based cooling liquid is the most important factor in what flow speed can be reached in the cooled charge cable 3. The flow of the cooling liquid determines directly the cooling capability. Thus, if the oil-based cooling liquid is too cold and therefore too viscous to provide enough flow for cooling the charge cable 3, the part of the charge cable 3 that is cooled last will overheat. In other words, if the temperature of the cooling liquid is so low that there is hardly any flow of the cooling liquid in the charge cable 3, the charge cable 3 will overheat and damage the charge cable 3.

Thus, the charge current regulating device 6 limits an actual charge current, in the exemplary implementation to 350 A instead of 500 A as maximum charge current. Such temporary reduction of the charge current halves any losses due to internal charge cable 3 resistances in the charge cable 3. In parallel, the cooling liquid is given sufficient time to heat up for example in a cooling liquid reservoir such that the risk of damaging the charge cable 3 due to insufficient cooling liquid flow is mitigated. Once the temperature of the oil-based cooling liquid at a supply point to the charge cable 3 reaches the temperature threshold, the charge current can be increased for example to its nominal value without any risk of damaging the charge cable 3.

For measuring the temperature of the cooling liquid, the EVSE 1 comprises an input temperature measuring device 7 which is configured and arranged within the EVSE 1 for measuring the temperature of the cooling liquid that is applied towards the charge cable 3 and an output temperature measuring device 8 which is configured and arranged within the EVSE 1 for measuring the temperature of the cooling liquid that comes back from the charge cable 3 thereby having cooled the charge cable 3.

The charge current regulating device 6 measures via the input temperature measuring device 7 and the output temperature measuring device 8 an input temperature and an output temperature of the charging liquid. As long as a temperature difference between the input temperature and the output temperature is above a threshold, since oil-based liquid cooling doesn't move too well as long as being cold, the charge current regulating device 6 reduces the charge current below a threshold. Once the temperature difference is below the threshold, the charge current is increased. Such way a self-regulating EVSE 1 is provided.

Referring back to FIG. 1, the EVSE 1 comprises a fluid supply line 9, which runs from the EVSE 1 to the charge connector 4 and is connected within the charge connector 4 to the charge cable 3 for injecting the cooling liquid into the charge cable 3. The fluid supply line 9 runs in parallel to the charge cable 3 while being separated from the charge cable 3 thereby functioning as conveyer line for the cooling liquid. The cooling liquid is injected within the charge connector 4 into the charge cable 3 thereby functioning as fluid return line.

In this regard, the input temperature measuring device 7 is arranged at an end of the fluid supply line 9 leaving the EVSE 1 and the output temperature measuring device 8 is arranged at an end of the charge cable 3 reaching the EVSE 1. The input temperature measuring device 7 may measure the temperature of the cooling liquid in a cooling liquid reservoir to which the end of the fluid supply line 9 is connected. In sum, the proposed solution prevents local hotspots in the charge cable 3, and therefore prevents an emergency shutdown due to too high temperatures in the fluid return line i.e. in the charge cable 3.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST

1 Electric vehicle charge equipment (EVSE)
2 Electrical vehicle
3 Charge cable
4 Charge connector
5 Conductor
6 Charge current regulating device
7 Input temperature measuring device
8 Output temperature measuring device
9 Fluid supply line

What is claimed is:

1. An electric vehicle charge equipment (EVSE) configured for supplying a charge current to an electrical vehicle, the EVSE comprising:

- a liquid cooled charge cable with a charge connector configured to connect to the electrical vehicle; and
- a charge current regulating device configured for regulating the charge current based on a temperature of the cooling liquid,
- wherein regulating the charge current comprises:
  - charging the electrical vehicle with a first charge current for an initial time period and thereafter charging the electrical vehicle with a second charge current that is greater than the first charge current, and
  - reducing the charge current as long as the temperature of the cooling liquid is below a temperature threshold, or
  - charging the electrical vehicle with a first charge current as long as the temperature of the cooling liquid is below a temperature threshold and thereafter charging the electrical vehicle with a second charge current that is greater than the first charge current.

2. A method for regulating a charge current at an electric vehicle charge equipment (EVSE) configured for supplying the charge current to an electrical vehicle, the EVSE comprising a liquid cooled charge cable with a charge connector for connecting to the electrical vehicle, the method comprising:

- regulating the charge current based on a temperature of the cooling liquid,
- wherein regulating the charge current comprises:
  - charging the electrical vehicle with a first charge current for an initial time period and thereafter charging the electrical vehicle with a second charge current that is greater than the first charge current, and reducing the charge current as long as the temperature of the cooling liquid is below a temperature threshold, or charging the electrical vehicle with a first charge current as long as the temperature of the cooling liquid is below a temperature threshold and thereafter charging the electrical vehicle with a second charge current that is greater than the first charge current.

3. The EVSE according to claim 1, wherein regulating the charge current comprises measuring the temperature of the cooling liquid.

4. The EVSE according to claim 1, wherein regulating the charge current is based on the temperature of the cooling liquid and on an ambient temperature.

5. The EVSE according to claim 1, wherein regulating the charge current comprises measuring temperatures of the cooling liquid at an input and an output for the cooling liquid at the charge cable and, as long as a difference of the measured temperatures exceeds a temperature threshold, reducing the charge current.

6. The EVSE according to claim 1, further comprising a fluid supply line, which runs from the EVSE to the charge connector and is connected at the charge connector to the charge cable for injecting the cooling liquid into the charge cable.

7. The EVSE according to claim 1, further comprising an input temperature measuring device configured for measuring the temperature of the cooling liquid applied towards the charge cable and an output temperature measuring device configured for measuring the temperature of the cooling liquid having cooled the charge cable.

8. The EVSE according to claim 7, wherein the input temperature measuring device and the output temperature measuring device are arranged within the EVSE.

9. The EVSE according to claim 1, wherein the temperature threshold depends on the cooling liquid.

10. The method according to claim 2, wherein regulating the charge current comprises measuring the temperature of the cooling liquid.

11. The method according to claim 2, wherein regulating the charge current is based on the temperature of the cooling liquid and on an ambient temperature.

12. The method according to claim 2, wherein regulating the charge current comprises measuring temperatures of the cooling liquid at an input and an output for the cooling liquid at the charge cable and, as long as a difference of the measured temperatures exceeds a temperature threshold, reducing the charge current.

13. The method according to claim 2, further comprising a fluid supply line, which runs from the EVSE to the charge connector and is connected at the charge connector to the charge cable for injecting the cooling liquid into the charge cable.

14. The method according to claim 2, further comprising an input temperature measuring device configured for measuring the temperature of the cooling liquid applied towards the charge cable and an output temperature measuring device configured for measuring the temperature of the cooling liquid having cooled the charge cable.

15. The method according to claim 14, wherein the input temperature measuring device and the output temperature measuring device are arranged within the EVSE.

16. The method according to claim 2, wherein the temperature threshold depends on the cooling liquid.

* * * * *